United States Patent [19]

McCall

[11] 3,926,303
[45] Dec. 16, 1975

[54] CONVEYOR TROLLEY CLEVIS HANGER SAFETY ATTACHMENT DEVICE

[75] Inventor: John W. McCall, Birmingham, Mich.

[73] Assignee: Formall, Inc., Warren, Mich.

[22] Filed: Sept. 23, 1974

[21] Appl. No.: 508,276

[52] U.S. Cl. .............. 198/177 R; 104/89; 104/95; 104/172 S; 105/156; 105/148; 105/154
[51] Int. Cl.² ........................................ B65G 17/20
[58] Field of Search ....... 198/177 R, 177 T; 104/89, 104/95, 172 S; 105/156, 148, 154; 211/177; 248/159, 220.5; 403/364, 326, 2, 11

[56] References Cited
UNITED STATES PATENTS
2,892,419  6/1959  King ............................... 198/177 R
3,724,387  4/1973  Civitarese ...................... 198/177 R

*Primary Examiner*—James B. Marbert

[57] ABSTRACT

In a hanger device for removable attachment to the clevis of a conveyor trolley, a hanger proximal pad portion or member secured by the clevis pin and a pair of removable lateral safety retaining pads or members overlying the headed ends of the clevis pin, to provide a safety hanger. The hanger device is preferably fabricated of a plastic material providing a high load bearing surface for the clevis pin, substantially improving the functional operation of the hanger. The lateral safety retaining members at least temporarily secure and support the hanger device upon the headed ends of the clevis pin in the event that the hanger proximal pad portion, at the clevis pin bearing opening, should fail for any reason. A vertical change in position of the hanger upon the trolley clevis pin also signals the need for remedial action to protect the hanger and its load before ultimate failure. In addition, fabricating the clevis safety attachment device and hanger of a suitable plastic material permits coloring the device throughout to meet required government-ordered safety specifications.

18 Claims, 10 Drawing Figures

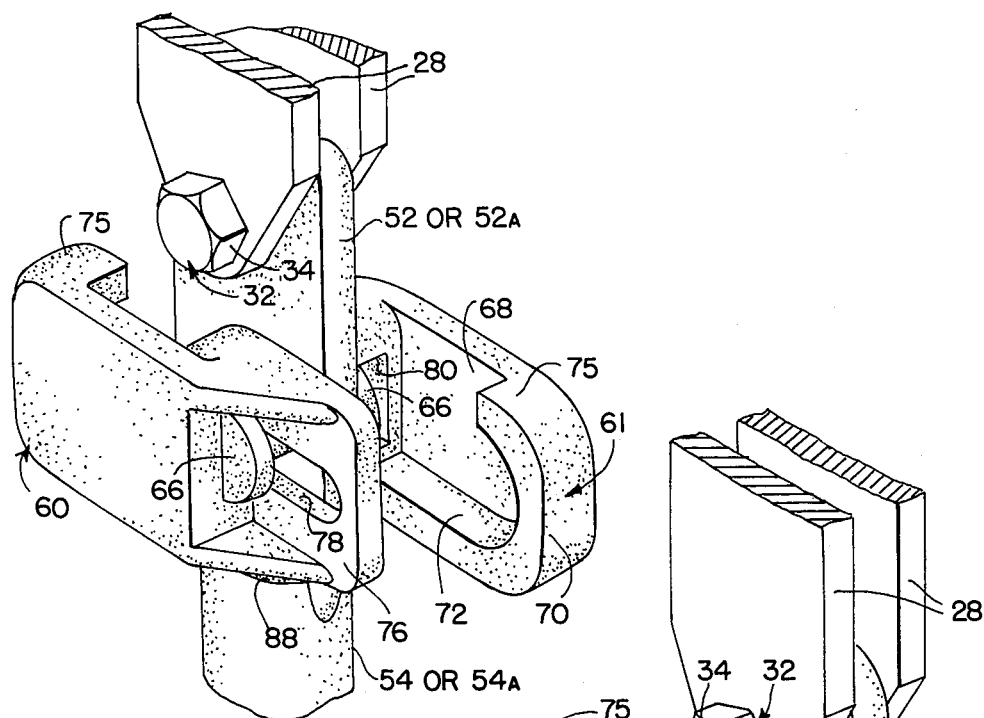
FIG. 8
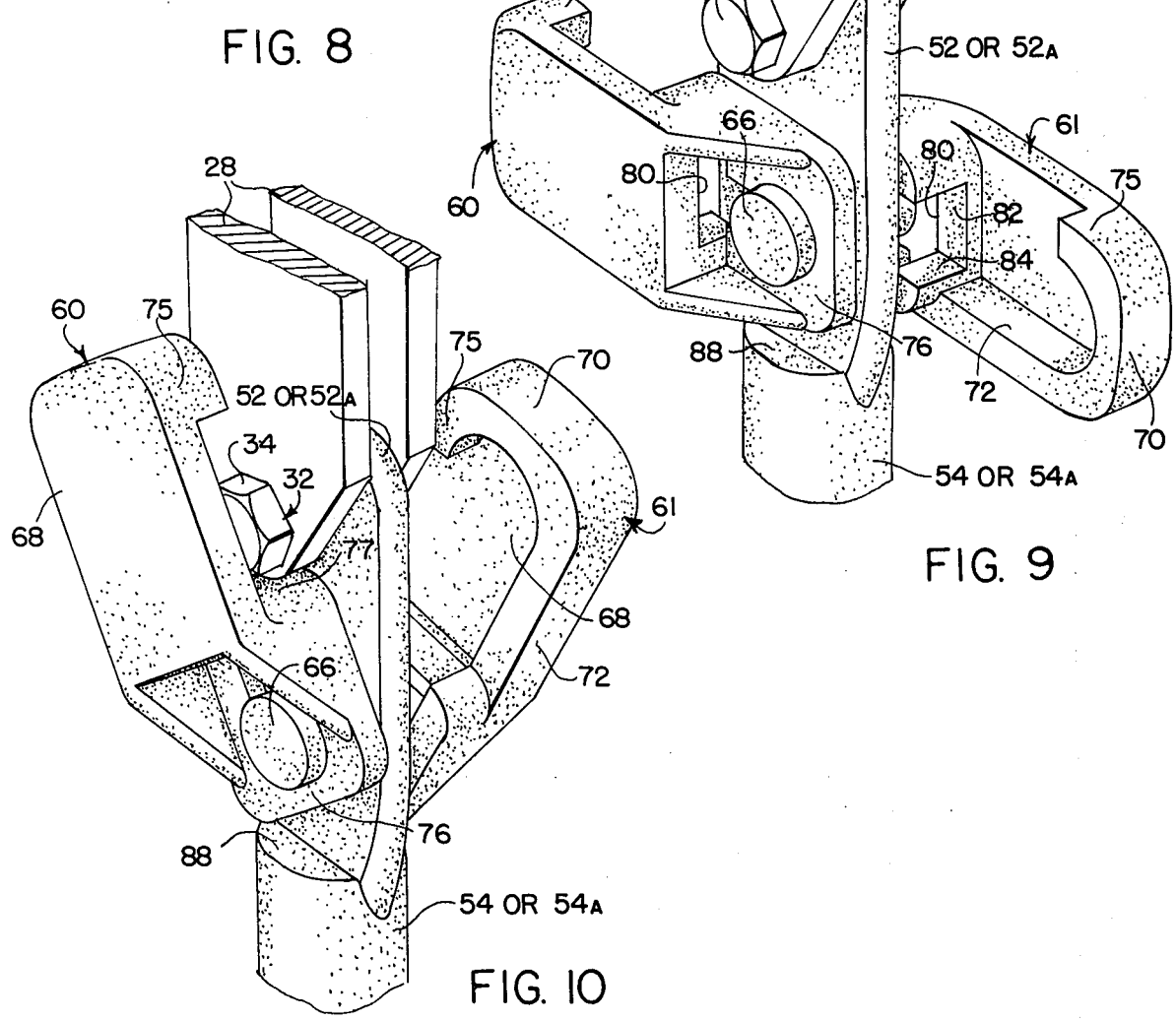
FIG. 9
FIG. 10

CONVEYOR TROLLEY CLEVIS HANGER SAFETY ATTACHMENT DEVICE

BACKGROUND OF THE INVENTION

Drive chain operated conveyor trolley systems have long been in use in industry. These systems employ trolleys which roll and are supported upon a beam disposed substantially above the floor of the area in which parts or devices are conveyed and translated from one location to another. The trolleys have depending bracket portions, generally in the form of a clevis, upon which a hanger rod or other depending member is pivotally secured by a clevis pin passed through the clevis portion and an opening in the hanger rod at its upper or proximal end. The hanger rod generally is free to pivot upon the clevis pin. As the trolleys are moved along by the drive chain on the supporting beam, the parts loaded hanger rod depending from the clevis is caused to swing upon the clevis pin. These hanger rods and the clevis pin are generally made of steel, and in time either the clevis pin will shear and fail, or the openings for it in the hanger rod will elongate and ultimately extend through the proximal end of the rod, in either event causing a failure of the hanger rod, usually with a load of metallic parts or devices being carried thereon.

Additionally, the hanger rods, loaded with machined metal parts or devices, and normally being of conventional steel blue grey coloring, unless rusted, are not easily observed in factory installations, particularly where a fair amount of smoke or other environmental atmospheric conditions are present, interfering with clear visibility. At times, persons in the area adjacent the path of the conveyor system and the hanger rods suspended from moving trolleys, have been struck and injured because they have not observed the approach and presence of loaded hangers. Such injuries have brought about, in part, the federal Occupational Safety and Health Act (OSHA), which provides in part that a moving hazard, such as depending conveyor hanger rods, must be colored in yellow or other safety-denoting color, to make them more readily observable and visible. The device of this invention, preferably being made of a plastic material which can be colored superficially or throughout satisfies such OSHA requirements. In addition, preferred plastic materials of which the device of this invention is or can be made render it less injurious to personnel with whom it may come in contact, than would a steel hanger device of similar design.

SUMMARY OF THE INVENTION

The invention pertains to a conveyor trolley clevis hanger safety attachment device comprising a trolley hanger attachment portion or member pivotally secured to and depending from the clevis on a conveyor trolley by a conventional headed clevis pin passed through a proximal portion of the hanger member, and a pair of lateral safety retaining members removably secured to and on either side of the engaged hanger proximal portion or member and closely adjacent and overlying the headed ends of the clevis pin, to engage these ends upon failure of the hanger at the clevis pin and to prevent disengagement of the clevis pin from the hanger proximal portion. The safety retaining members are each movable and pivotable upon and about headed hanger pins extending laterally outwardly from each side of the hanger proximal member.

The hanger proximal portion or member and the lateral safety retaining members are preferably made of a plastic material having substantially high load-bearing characteristics, since some of the loads on the hanger rods approach or exceed 200 pounds, substantially high tensile strength, and substantially high resistance to deformation at ambient temperatures of from about 60° to 150° F., corrosive atmospheres, chemical solutions, and physical abrasion. In special applications, specifically formulated plastic materials capable of withstanding up to about 500° F. can be provided.

The hanger device of this invention, in addition to the clevis attachment portion at its proximal end, further comprises an integrally or separately formed depending hanger bar or rod having integrally formed or separately attachable laterally extending arms or members designed to support parts and devices to be carried by the conveyor. The hanger device of this invention is preferably formed by molding a selected plastic material of suitable or specified color, whereby the presence of the device can be readily observed by personnel working or present in the area of the conveyor system.

It is an object of the invention to provide a parts supporting hanger attachment device for conveyor trolley clevis brackets which is preferably fabricated of a plastic material, of substantially high strength with minimal wear characteristics, and adapted to be removably secured to the trolley clevis portion. Another object is to provide such a device having a hanger proximal portion or member and lateral safety retaining members removably secured to the proximal portion or member, and adapted to engage the external headed portions of the trolley clevis pin upon failure of the bearing portion of the said proximal portion or member. Yet another object is to provide such hanger device of a plastic material that can be permanently colored, superficially or throughout, for visual signalling of its presence in the area of a trolley conveyor system.

Various further and more specific objects, features and advantages of the invention will appear from the description given below, taken in connection with the accompanying drawings, illustrating by way of example a preferred form or forms of the invention. Reference is here made to the drawings annexed hereto and forming an integral part of this specification, in which FIG. 1 is a perspective view of a portion of a trolley conveyor system illustrating a conveyor beam, a trolley thereon, and a hanger device removably secured to the trolley clevis portion, with parts suspended on arms extending laterally from the depending hanger rod, as a representative example of a device embodying the invention.

FIG. 8 is a perspective view of the safety retaining members illustrated in FIG. 4 as they are initially presented to the headed lugs of the hanger proximal pad portion for engagement therewith.

FIG. 9 is a perspective view similar to FIG. 8, showing the safety retaining members fully engaged by the headed lugs before rotation of the members into clevis pin head overlying posture.

FIG. 10 is a perspective view similar to FIGS. 8 and 9, showing the safety retaining members rotated upwardly from the horizontal positions shown in FIG. 9 to a posture approaching their vertical positions overlying the clevis pin heads as shown in FIG. 2.

DESCRIPTION OF PREFERRED EMBODIMENTS

Figure 1:
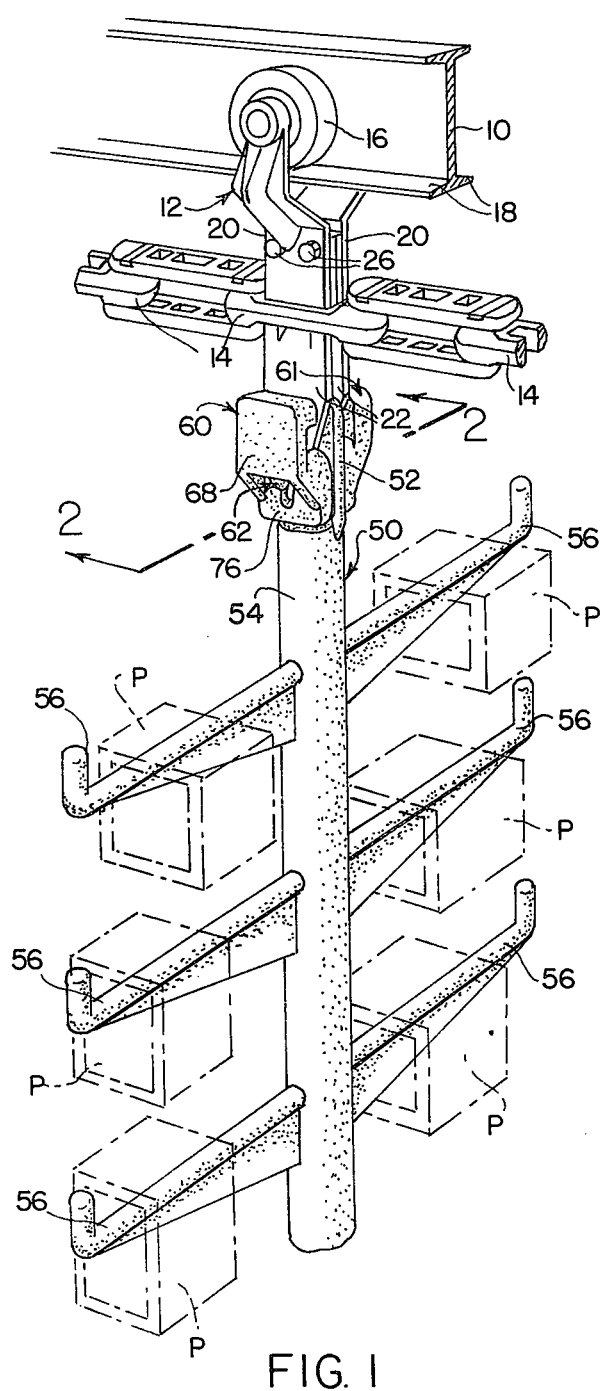

As illustrated particularly in FIG. 1, the overhead conveyor beam 10 supports the trolley assembly 12 for rolling movement thereon. Conveyor drive chain linkage 14 is secured to each trolley 12 and the conveyor system is driven by a power source not shown. The trolley assemblies 12 comprise in part a pair of rollers 16 disposed on each side of the beam 10 and ride upon the beam lower flanges 18,18, a pair of depending legs 20,20 affixed to the ends of the shafts supporting the rollers 16 and spaced apart and securing therebetween a pair of depending clevis members 22,22, at their upper ends 24,24 by screws 26,26. The clevis members 22,22 terminate at their lower distal ends in depending spaced apart distal portions or members 28,28 having aligned openings 30,30 to receive a clevis pin 32 therethrough. The clevis pin 32 has a head 34 at one end, a threaded portion 36 at its opposite distal end to which a nut 38 is threadedly affixed and an intermediate cylindrical or shaft portion 40 disposed within and extending between the openings 30,30 of the clevis members 28,28.

A parts-carrying conveyor hanger 50, suspended from the clevis member 22,22 by and upon the clevis pin 32, comprises a proximal pad portion or member 52, a rod portion 54 depending from and affixed to the proximal portion 52, and one or more parts-supporting arms 56 affixed to the rod 54. The hanger rod portion and its laterally extending arms, 54, 56 respectively, can be of any new or conventional design. Various configurations of a hanger rod and arms, designed for carrying devices or parts P suspended upon these hanger arms, can be utilized in and with the invention hereindisclosed.

Figure 5:
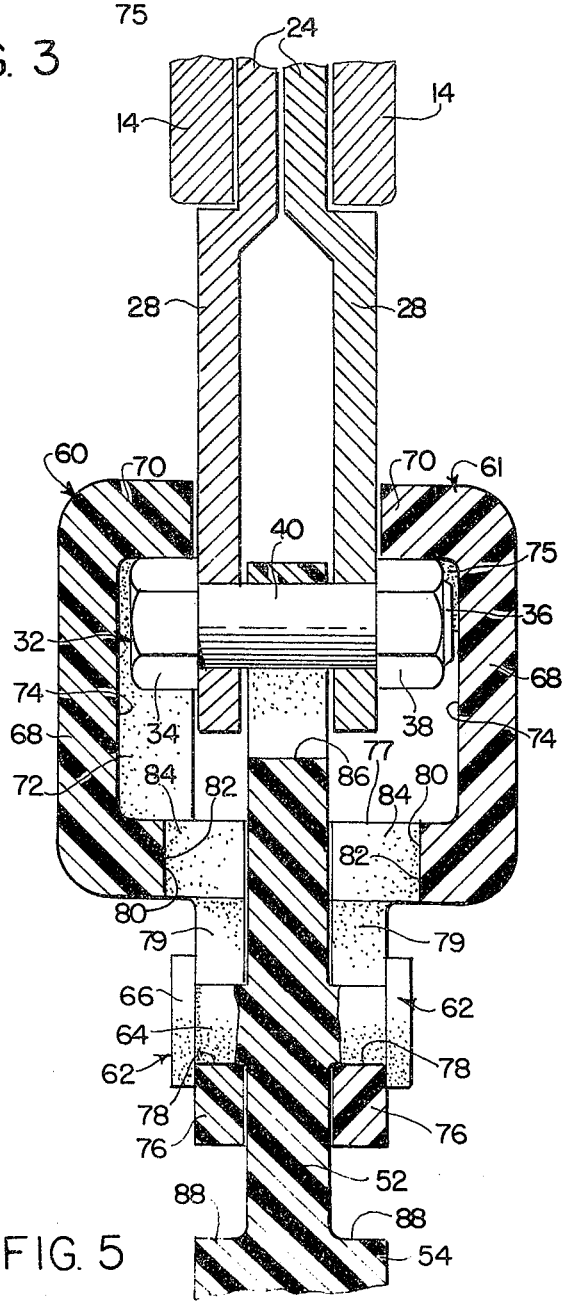
FIG. 5 is a transverse vertical sectional view, similar to that in FIG. 2, of the hanger proximal portion having a clevis pin opening elongated sufficiently to require engagement by the lateral safety retaining members with and upon the headed ends of the clevis pin.
Figure 6:
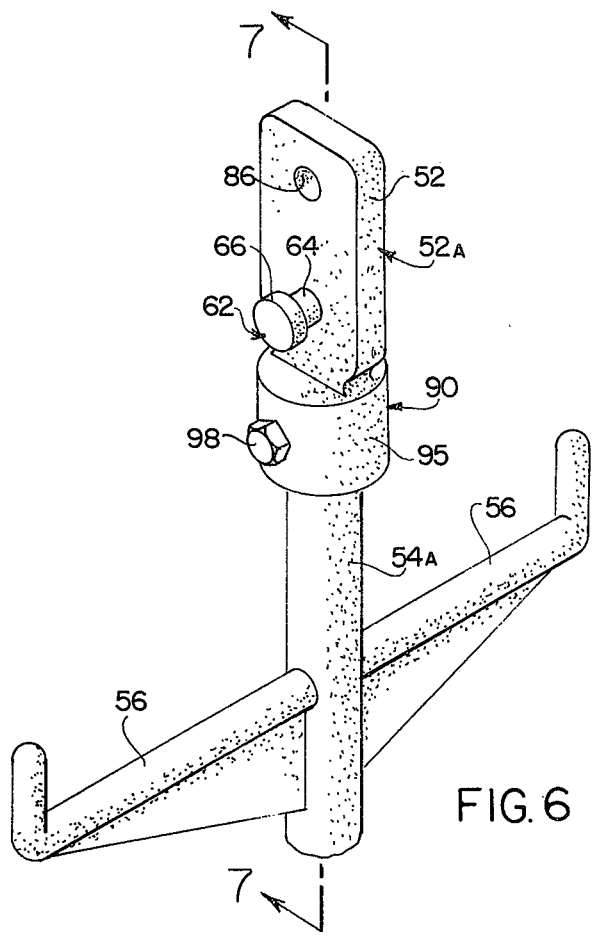
FIG. 6 is a perspective view of a second preferred embodiment illustrating a separate hanger proximal pad member and a depending hanger rod secured thereto.
Figure 7:
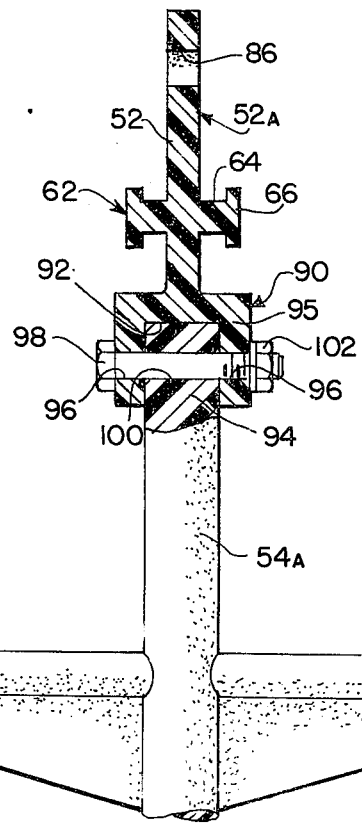
FIG. 7 is a vertical sectional view taken substantially on the line 7—7 of FIG. 6.

Preferred forms of the hanger 50, comprising the proximal pad portion 52 and a depending hanger rod and lateral extending arms, are formed either as an integral part or as separate components, molded of a suitable plastic material. The first of these forms, the integral part, is illustrated in FIGS. 1–5 inclusive, the second form, separate and separable parts, is illustrated in FIGS. 6 and 7. Such material can be selected from a group including fiberglass-reinforced nylon, polypropylene, high density polyethylene, acrylonitrile-butadiene-styrene (ABS), polystyrene, and other similar or equivalent plastic materials, free of or reinforced with fiberglass filaments. Desirable physical properties of the selected plastic material should include high load-bearing characteristics, substantially high tensile strength, substantially high resistance to deformation at ambient temperatures of from about 60° to 150° F., corrosive atmospheres, chemical solutions, and physical abrasion. Most of the above-identified plastic materials can be foamed and the foamed plastic fabricated by molding into the members hereindisclosed. Foamed plastic materials have the futher advantage of being substantially lower in weight, further improving their safety and utility in conveyor system components.

The hanger proximal pad portion 52 is provided with a pair of laterally disposed safety retaining members or pads 60,61 (left hand and right hand, respectively) removably secured thereto upon and about the headed pivot lugs 62,62 disposed in substantial axial alignment with each other and extending laterally from and on opposite sides of the proximal pad portion 52. Although the headed lugs 62,62 are preferably formed integrally with the proximal pad portion 52, they can be otherwise fabricated and affixed thereto.

The headed lugs 62,62 each comprises a shank or pin portion 64 and a distal flange or head 66 having a diameter somewhat greater than the diameter of the pin portion 64.

The hanger safety retaining member 60,61 each comprises an outer wall 68, an upper wall 70 and a side wall 72 extending laterally inwardly from the outer wall and substantially defining a recess area 74 therebetween, a depending flange member 76 extending laterally inwardly from the outer wall 68 and the side wall 72 and substantially parallel to the outer wall 68, and provided with a vertical slot 78, defined by flange portions 79,79 the slot extending upwardly to and communicating with a transverse opening 80 defined by an outer wall 82 and spaced apart side walls 84,84.

Figure 2:
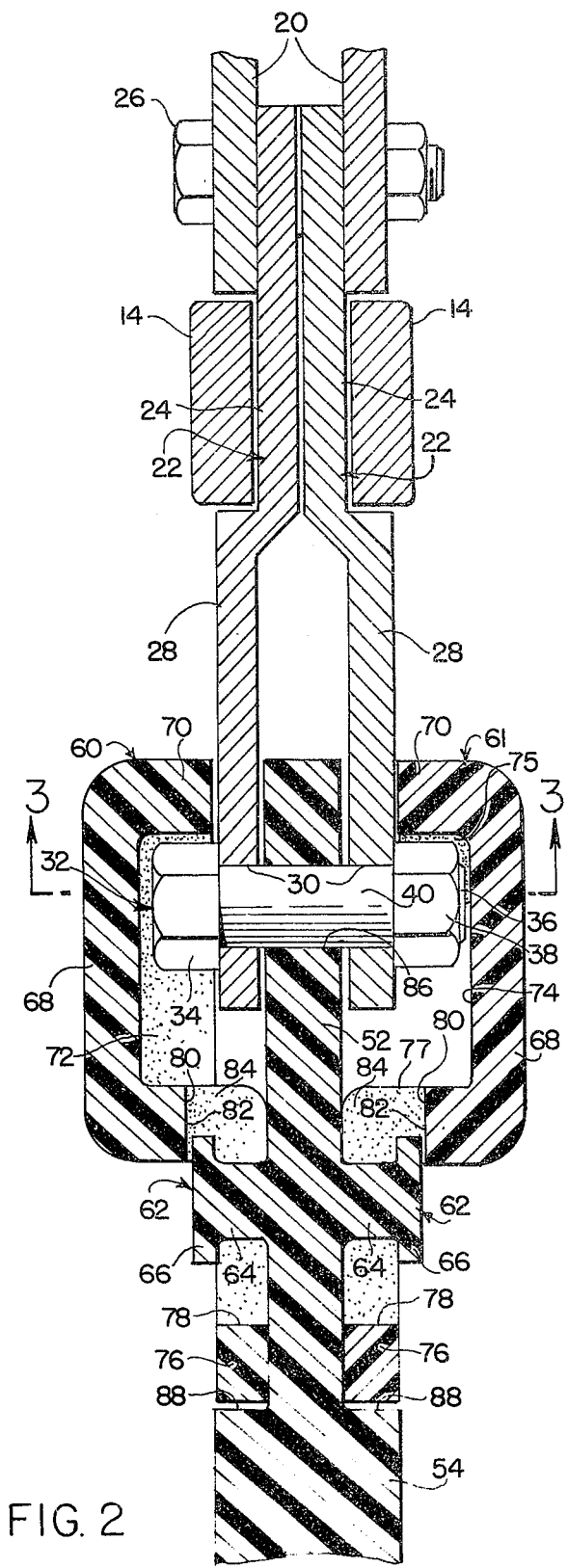
FIG. 2 is a transverse vertical sectional view taken substantially on the line 2—2 of FIG. 1.
Figure 3:
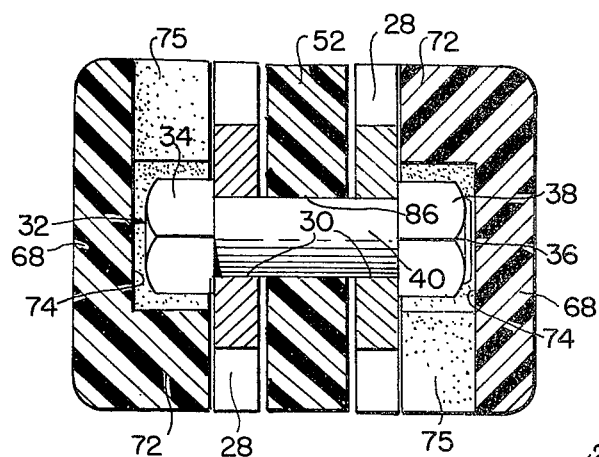
FIG. 3 is a transverse horizontal sectional view taken substantially on the line 3—3 of FIG. 2.
Figure 4:
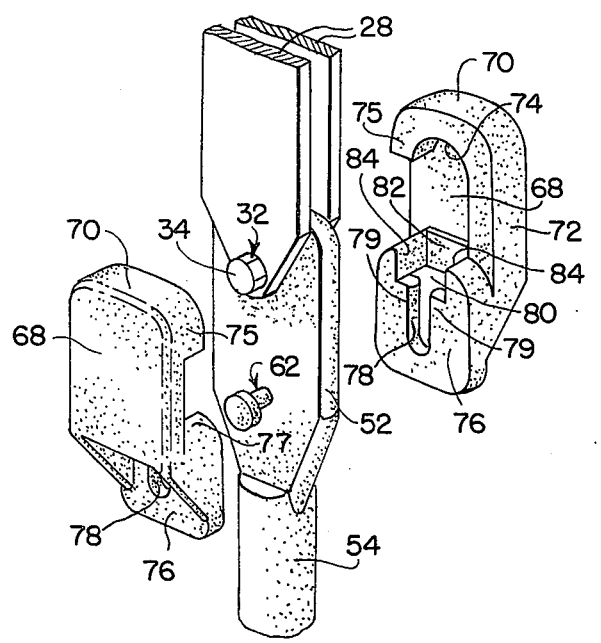
FIG. 4 is an exploded view in perspective of components and their relationship in the hanger attachment device illustrated in FIG. 1.

The safety retaining members are further provided with a downwardly extending wall portion 75 connected to the upper wall 70 and spaced above the shoulder 77 adjacent one of the side walls 84 and connected to the flange member 76 and the outer wall 68, the wall portion 75 and shoulder 77 defining and providing an entry therebetween for a head of the clevis pin 32. The opposite side of recess area 74 is closed off by the side wall 72. The inner surfaces of upper wall 70 and adjacent portions of side wall 72 and wall portion 75 are substantially continuous and preferably arcuate so that a substantial portion of each head 34 or 38 of clevis pin 32 can be substantially encircled therewithin when the safety retaining members are in their normal operating postures as shown in FIGS. 2 and 5.

The hanger proximal pad portion 52 is provided with a transverse bearing opening 86 adapted to receive the clevis pin portion 40. When such opening closely encircles the pin portion, as in FIG. 2, the safety retaining members 60,61 assembled upon the headed lugs 62,62 will rest closely adjacent the shoulder 88 at the upper end of the hanger rod 54. However, should the clevis pin opening 86 elongate substantially, as for instance as shown in FIG. 5, the headed pins 62,62 will assume lower positions in the recesses 78 of the safety retaining members 60,61 until they reach the lower end of those slots or until the upper walls 70 come into contact with the heads 34,38 of the clevis pin 32.

A second preferred embodiment of the invention is that illustrated in FIGS. 6 and 7, in which the hanger proximal pad member 52a comprises the body 52 and the integrally formed lower hub section or portion 90. The hub portion is provided at its distal end with a counterbore 92 axially thereof adapted to receive therewithin the proximal end 94 of the hanger rod 54a.

The outer wall 95 of hub portion 90 is further provided with axially aligned transverse bores 96,96 to receive a fastener such as the headed screw 98. The proximal hanger rod end portion 94 is also provided with an opening 100 transversely therethrough for alignment with the openings 96,96 in the hub section 90, to receive the screw 98.

To form a hanger 50 embodying the invention, the proximal pad member 52a is affixed to the proximal end 94 of hanger rod 54a and assembled with the screw 98 and the nut 102. Thereafter the hanger is provided with the safety retaining members 60,61 in the same manner and to form the same relationships with the clevis members 28,28 and the headed clevis pin 32, as described hereinabove and below. It will, of course, be understood by persons skilled in the art that the manner and means of attachment of a hanger rod to the hub section 90 of proximal pad member 52a are various and fully within the competence of persons skilled in the art to which the invention pertains. The form and means of attachment illustrated in FIGS. 6 and 7 are disclosed herein as a single representative example.

To assemble the device of this invention for operation, the hanger 50, in either of the preferred embodiments hereindisclosed, is removably secured to the trolley clevis members 28,28 by the clevis pin 32 in the following manner. The proximal pad portion 52 or the member 52a is inserted between the clevis members 28,28 so that the transverse bearing opening 86 therein aligns with the openings 30,30 in the clevis members. The headed clevis pin is then passed through these three openings and the retaining nut 38 threaded onto the portion 36, bringing the pin portion 40 into bearing contact with the clevis members and the proximal pad portion 52 or member 52a.

To protect and prevent a fall by failure of the hanger at the opening 86, the safety retaining members 60,61 are attached to the proximal pad portion 52 and upon and about the headed clevis pin 32 in the following manner. A safety retaining member is presented to a headed lug 62 on one side of the proximal pad portion 52 by rotating the safety retaining member so that it is substantially horizontal or at 90° to its normal vertical operating posture and with the entry to recess 74 directed upwardly. The flange member 76 is then brought into contact with the side surface of the proximal pad portion 52 or member 52a so that the lug head 66 enters into opening 80 intermediate the walls 84,82,84 and the lug or pin portion 64 is disposed in alignment with the slot 78 defined by and between 79,79 flanges 79,79 adjacent thereto. The safety retaining member is then moved in a plane parallel to the contacted surface of the proximal pad portion 52 or member 52a so that the lug portion 64 passes fully into and seats in the bottom of the slot 78, the lug head 66 being then disposed closely adjacent the outer surface of the flange 76, to retain the safety retaining member 60,61 substantially parallel to and upon the proximal pad portion 52 or 52a.

Each safety retaining member is then rotated upwardly in a clockwise direction about the pin portion 64 of headed lug 62 as a pivot until a headed end of the clevis pin 32, be it the pin head 34 or the nut 38, is fully disposed within the recess 74 defined by the depending wall portion 75, the upper wall 70 and the side wall 72. The safety retaining member is then allowed to slide downwardly upon the headed lug 62 until a bottom surface or edge of the depending flange member 76 comes into contact with the shoulder 88 of the hanger rod 54 or 54a, or alternatively the upper wall 70, and/or adjacent portions of side wall 72 and/or the depending wall portion 75, come into bearing contact with and upon the headed portions 34 and 38 of the clevis pin 32.

Upon a failure of the proximal pad portion 52 or member 52a at the bearing opening 86, as illustrated in FIG. 5, the safety retaining members 60,61 will engage the heads 34 and 38 of the clevis pin 32 so as to prevent the hanger rod 54 or 54a, loaded with parts, from falling to the floor in the area of the conveyor system. Periodic inspection of the hangers 50 will reveal the necessity, if any, for replacement or repair of the proximal pad portions 52 or members 52a. The lowering of the hangers at the proximal pad portions 52 or members 52a provides a signal to conveyor maintenance personnel that a failure can be anticipated, so that appropriate precautions against failure can be taken and preventive maintenance effected. In addition, by virtue of their attachment to the headed lugs 62,62, the safety retaining members 60,61 in their operative posture prevent lateral displacement and disengagement of the clevis pin 32 from the hanger proximal pad portion 52 or 52a.

Although particular embodiments of the invention have been disclosed herein for purposes of explanation, further modifications or variations thereof, after study of this specification, will or may become apparent to those skilled in the art to which the invention pertains. Reference should be had to the appended claims in determining the scope of the invention.

I claim:

1. A parts-carrying safety hanger device for removable securement to an overhead conveyor trolley clevis by a headed clevis pin, said device comprising
    a proximal pad portion having
        a body,
        a bearing opening transversely through said body for the shaft portion of said clevis pin,
        and a pair of lugs extending laterally, one from each side of said body,
    a rod portion connected to said proximal pad portion and depending therefrom, and having one or more parts-carrying arms connected thereto,
    and a pair of safety retaining members movably conjoined to said lugs, one on each side of said proximal pad portion, to overlie the outer ends of said clevis pin when said members are aligned with said proximal pad portion.

2. The safety hanger device defined in claim 1, wherein
    said proximal pad and rod portions are formed integrally as a unit of a molded plastic material.

3. The safety hanger device defined in claim 1, wherein
    said proximal pad and rod portions are independent and separable,
    and means to secure said portions together as a unit.

4. The safety hanger device defined in claim 1, wherein
    said proximal pad portion is substantially planar.

5. The safety hanger device defined in claim 1, wherein
    said parts-carrying arms comprise a plurality of said arms extending laterally from said rod portion.

6. The safety hanger device defined in claim 1, wherein said parts-carrying arms comprise a plurality of said arms extending radially from said rod portion.

7. The safety hanger device defined in claim 1, wherein
each said safety retaining member is provided with a depending flange having an entry and a slot for one said lug,
whereby said member is slidable upon and pivotable about said lug.

8. The safety hanger device defined in claim 7, wherein
said safety retaining member above said depending flange comprises
an outer wall, an upper wall, a side wall and a downwardly extending wall portion connected to said upper wall defining a recess area therewithin for a headed end of said clevis pin.

9. The safety hanger device defined in claim 8, and including
a shoulder on said depending flange aligned with and spaced from said downwardly extending wall portion defining an entry for said clevis pin headed end to said recess area.

10. The safety hanger device defined in claim 1, wherein
said lugs are axially aligned and project laterally from each side of said body.

11. The safety hanger device defined in claim 10, wherein
said lugs are headed at their distal ends.

12. The safety hanger device defined in claim 11, wherein
said safety retaining members are provided with means for removable and pivotable attachment to said lugs.

13. The safety hanger device defined in claim 12, wherein
said means for removable and pivotable attachment comprises
a transverse opening adjacent said depending flange, and edge portions adjacent and defining said slot in said depending flange,
said transverse opening adapted to receive and pass said headed lug therethrough, said edge portions adapted to pass said lug therebetween and to engage said lug head.

14. The safety hanger device defined in claim 1, wherein
said proximal pad portion, said rod portion and said safety retaining members are formed of a molded plastic material having a substantially high impact resistance character.

15. The safety hanger device defined in claim 14, wherein
said plastic material is further characterized by having substantially high tensile strength and high load-bearing qualities.

16. The safety hanger device defined in claim 14, wherein
said plastic material is further characterized by having substantially high resistance to deformation at ambient temperatures, corrosive atmospheres, chemical solutions and physical abrasion.

17. The safety hanger device defined in claim 14, wherein
said plastic material is further characterized by being foamed and reinforced with fiberglass filaments.

18. The safety hanger device defined in claim 14, wherein
said plastic material is further characterized by being reinforced with fiberglass filaments.

* * * * *